(12) United States Patent
Hall et al.

(10) Patent No.: US 10,223,888 B2
(45) Date of Patent: *Mar. 5, 2019

(54) PERSONNEL AUTHENTICATION AND TRACKING SYSTEM

(71) Applicant: Tyco Fire & Security GmbH, Neuhausen am Rheinfall (CH)

(72) Inventors: Stewart E. Hall, Wellington, FL (US); Robert F. Brewin, Honolulu, HI (US); Scott M. Clements, Zurich (CH)

(73) Assignee: Tyco Fire & Security GmbH, Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/366,036

(22) Filed: Dec. 1, 2016

(65) Prior Publication Data

US 2017/0084146 A1    Mar. 23, 2017

Related U.S. Application Data

(63) Continuation of application No. 14/463,984, filed on Aug. 20, 2014, now Pat. No. 9,513,364.

(Continued)

(51) Int. Cl.
*G08B 13/00* (2006.01)
*G08B 13/24* (2006.01)
(Continued)

(52) U.S. Cl.
CPC ............ *G08B 13/2451* (2013.01); *G01S 5/02* (2013.01); *G01S 5/0236* (2013.01); *G01S 5/0284* (2013.01);
(Continued)

(58) Field of Classification Search
CPC .............. A61B 2019/448; G08B 21/02; H04N 21/44218
(Continued)

(56) References Cited

U.S. PATENT DOCUMENTS 4,581,634 A    4/1986 Williams
5,414,812 A    5/1995 Filip et al.
(Continued)

FOREIGN PATENT DOCUMENTS

CN    1217078 A    5/1999
CN    1672060 A    9/2005
(Continued)

OTHER PUBLICATIONS

Chinese Office Action dated May 30 ,2018 in corresponding application No. 201580016948.9.
(Continued)

*Primary Examiner* — Phung Nguyen
(74) *Attorney, Agent, or Firm* — Foley & Lardner LLP

(57) ABSTRACT

Disclosed are techniques to authenticate tags passing through detection regions against an access control list, receive data that identifies a number of people passing through or within the detection regions, compare the number people identified by the received data with the number of tags identified by the system, and cause an alarm to be asserted when a discrepancy is detected in the number people identified with the number of tags in a detection region with personnel within the detection region.

13 Claims, 9 Drawing Sheets

Related U.S. Application Data

(60) Provisional application No. 61/973,962, filed on Apr. 2, 2014.

(51) Int. Cl.

| | | |
|---|---|---|
| *H04W 4/029* | (2018.01) | |
| *H04W 4/80* | (2018.01) | |
| *G01S 5/02* | (2010.01) | |
| *G08B 25/10* | (2006.01) | |
| *G06N 5/02* | (2006.01) | |
| *H04L 29/08* | (2006.01) | |
| *H04W 84/18* | (2009.01) | |
| *G08B 13/196* | (2006.01) | |
| *H04N 7/18* | (2006.01) | |
| *G08B 13/22* | (2006.01) | |
| *H04L 12/741* | (2013.01) | |
| *H04W 88/16* | (2009.01) | |
| *G06K 9/00* | (2006.01) | |
| *G08B 25/00* | (2006.01) | |
| *G07C 9/00* | (2006.01) | |
| *G08B 7/06* | (2006.01) | |
| *H04W 4/02* | (2018.01) | |

(52) U.S. Cl.
CPC ........... *G01S 5/0294* (2013.01); *G06K 9/00* (2013.01); *G06N 5/027* (2013.01); *G07C 9/00007* (2013.01); *G08B 13/00* (2013.01); *G08B 13/19613* (2013.01); *G08B 13/19697* (2013.01); *G08B 13/22* (2013.01); *G08B 13/2491* (2013.01); *G08B 25/009* (2013.01); *G08B 25/10* (2013.01); *H04L 45/74* (2013.01); *H04L 67/02* (2013.01); *H04L 67/10* (2013.01); *H04N 7/181* (2013.01); *H04W 4/029* (2018.02); *H04W 4/80* (2018.02); *H04W 84/18* (2013.01); *H04W 88/16* (2013.01); *G08B 7/062* (2013.01); *H04W 4/02* (2013.01)

(58) Field of Classification Search
USPC .............. 340/541, 10.1, 572.1–572.9, 13.26; 705/7.15; 235/375
See application file for complete search history.

(56) References Cited

U.S. PATENT DOCUMENTS

| | | | |
|---|---|---|---|
| 6,873,260 B2 * | 3/2005 | Lancos | G07C 9/00103 340/5.2 |
| 6,888,459 B2 * | 5/2005 | Stilp | G07C 9/00103 340/10.1 |
| 7,295,106 B1 | 11/2007 | Jackson et al. | |
| 7,477,154 B2 | 1/2009 | Braunstein | |
| 7,512,406 B2 | 3/2009 | Dorfman | |
| 7,664,481 B2 | 2/2010 | Braunstein | |
| 7,688,808 B2 | 3/2010 | Ren et al. | |
| 7,907,753 B2 | 3/2011 | Wilson et al. | |
| 7,966,660 B2 | 6/2011 | Yermal et al. | |
| 7,978,082 B2 | 7/2011 | Braunstein | |
| 8,115,622 B2 | 2/2012 | Stolarczyk et al. | |
| 8,305,196 B2 * | 11/2012 | Kennedy | G06K 17/0022 235/382 |
| 8,305,842 B2 | 11/2012 | Holdsworth | |
| 8,572,290 B1 | 10/2013 | Mukhopadhyay et al. | |
| 2002/0057204 A1 | 5/2002 | Bligh | |
| 2003/0097586 A1 | 5/2003 | Mok | |
| 2004/0153671 A1 | 8/2004 | Schuyler et al. | |
| 2006/0047666 A1 | 2/2006 | Bedi et al. | |
| 2006/0143439 A1 | 6/2006 | Arumugam et al. | |
| 2006/0240818 A1 | 10/2006 | McCoy et al. | |
| 2007/0018826 A1 | 1/2007 | Nowak et al. | |
| 2007/0252001 A1 | 1/2007 | Kail et al. | |
| 2007/0094716 A1 | 4/2007 | Farino et al. | |
| 2007/0176779 A1 | 8/2007 | Braunstein | |
| 2007/0185788 A1 | 8/2007 | Dillon | |
| 2007/0260470 A1 | 8/2007 | Bornhoevd et al. | |
| 2007/0223451 A1 | 9/2007 | Ren et al. | |
| 2007/0248065 A1 | 10/2007 | Banerjea et al. | |
| 2008/0002599 A1 | 1/2008 | Yau et al. | |
| 2008/0083018 A1 | 4/2008 | Prokupets et al. | |
| 2008/0144587 A1 | 6/2008 | Gupta et al. | |
| 2008/0186180 A1 | 8/2008 | Butler et al. | |
| 2008/0204267 A1 | 8/2008 | Luterotti et al. | |
| 2008/0291017 A1 | 11/2008 | Yermal et al. | |
| 2009/0027225 A1 | 1/2009 | Farley | |
| 2009/0135007 A1 | 5/2009 | Donovan et al. | |
| 2009/0153333 A1 * | 6/2009 | Zhang | G07C 9/00111 340/572.4 |
| 2009/0222921 A1 | 9/2009 | Mukhopadhyay et al. | |
| 2010/0013711 A1 | 1/2010 | Bartlett | |
| 2010/0019901 A1 | 1/2010 | Tsai | |
| 2010/0052867 A1 * | 3/2010 | Kwok | G01V 15/00 340/10.42 |
| 2010/0194545 A1 | 8/2010 | Wong | |
| 2010/0226342 A1 | 9/2010 | Coiling et al. | |
| 2010/0324958 A1 | 12/2010 | Stiles et al. | |
| 2011/0035491 A1 | 2/2011 | Gelvin et al. | |
| 2011/0102171 A1 | 5/2011 | Raji et al. | |
| 2011/0304437 A1 | 12/2011 | Beeler et al. | |
| 2012/0039235 A1 | 2/2012 | Chen et al. | |
| 2012/0092183 A1 | 4/2012 | Corbett et al. | |
| 2012/0130632 A1 | 5/2012 | Bandyopadhyay et al. | |
| 2012/0182123 A1 | 7/2012 | Butler et al. | |
| 2012/0286929 A1 | 11/2012 | Kline | |
| 2012/0297049 A9 | 11/2012 | Alexander et al. | |
| 2013/0239192 A1 | 9/2013 | Linga et al. | |
| 2014/0052832 A1 | 2/2014 | Dina et al. | |
| 2014/0253706 A1 | 11/2014 | Noone et al. | |

FOREIGN PATENT DOCUMENTS

| | | |
|---|---|---|
| CN | 1871782 A | 11/2006 |
| CN | 101764759 A | 6/2010 |
| CN | 101951341 A | 1/2011 |
| CN | 101976377 A | 2/2011 |
| CN | 102035738 A | 4/2011 |
| WO | WO2008/139203 | 11/2008 |
| WO | WO2009/017687 | 2/2009 |

OTHER PUBLICATIONS

Office Action for Chinese Application No. 201580013946.4, dated Jul. 31, 2018, 15 pages.

Cheng, Research on AODV Routing Protocol of Wireless Network, Chinese Master's Theses Full-Text Database, Information Technology Division, Jul. 15, 2007, 82 pages.

First Office Action for Chinese Application No. 201580015282.5, dated Sep. 4, 2018, 18 pages.

Office Action for U.S. Appl. No. 15/402,423, dated Jul. 26, 2018, 10 pages.

* cited by examiner

PERSONNEL AUTHENTICATION AND TRACKING SYSTEM

CLAIM OF PRIORITY

This application claims priority from U.S. application Ser. No. 14/463,984, filed Aug. 20, 2014 know U.S. Pat. No. 9,513,364), which claims the benefit of U.S. Provisional Application Ser. No. 61/973,962, filed Apr. 2, 2014. The disclosure of the prior application is considered part of (and is incorporated by reference in) the disclosure of this application.

BACKGROUND

This description relates to operation of security systems in particular intrusion systems.

Wireless sensor network/wireless device based data collection systems with remote server-based monitoring and report generation are becoming more common in applications such as home safety monitoring, electrical and water utility meter monitoring, and human and asset tracking. For example, it is common for businesses and homeowners to have a security system for detecting alarm conditions at their premises and signaling the conditions to a monitoring station or to authorized users of the security system.

Traditional access control systems provide a valuable perimeter protection function to prevent unauthorized access to buildings or secured areas within buildings. An example of a traditional building system with separate systems for fire, surveillance and access control has people counting analytics to detect tailgating.

SUMMARY

According to an aspect, a system includes a processor and memory, with the system configured to authenticate tags passing through detection regions against an access control list, receive data that identifies a number of people passing through or within the detection regions, compare the number people identified by the received data with the number of tags identified by the system, and cause an alarm to be asserted when a discrepancy is detected in the number people identified with the number of tags in a detection region with personnel within the detection region.

Other aspects include computer program products and methods.

While, traditional access control systems provide a valuable perimeter protection function to prevent unauthorized access to buildings or secured areas within buildings, such systems have shortcomings to provide real-time information about the locations of people within the building particularly in emergency situations. Often during evacuations, access control is often disabled and doors are unlocked to facilitate the movement of people out of the buildings. This presents a number of problems for security managers. Employees need to manually check in at assembly areas in order to account for all people and to ensure that everyone got out. If an employee does not show up at an evacuation point, the manager might assume that he is still in the building when in reality he may be somewhere else (out of the office on travel or at a doctor's appointment). This uncertainty can delay a search for the missing employee or potentially put emergency responders into harms-way looking for someone who is not inside. During emergencies, access control systems are often disabled to allow for people to move freely to get out of the building or to assist others to evacuate which produces a security hole for facilities, allowing people access to secure areas during an evacuation. Another shortcoming of traditional access control systems is that they focus primarily on perimeter protection and provide little intrusion detection once a person has penetrated the perimeter of a building or secured area.

In a typical installation with an access control system, the building surveillance system and the fire system are separate. In these traditional systems, an intruder can often evade the access control protection by tailgating behind an authorized person. Security managers have tried to protect against this by implementing tailgating detection systems at the doorways that associate the number of credentials that are presented with the number of people passing through the entrance.

However, technologies used to count people typically have less than complete accuracy that maybe only about 95% at a doorway. Therefore, the number of false alarms would typically be about 5%. People counting systems can be deployed that have higher accuracy but the cost of installing these systems to reliably prevent tailgating without high false alarms is usually too high for many applications.

The details of one or more embodiments of the invention are set forth in the accompanying drawings and the description below. Other features, objects, and advantages of the invention is apparent from the description and drawings, and from the claims.

DESCRIPTION OF DRAWINGS

FIG. 5 is a block diagram of an example implementation of personnel authentication and tracking appliance combined with a traditional fire system notification appliance.

FIG. 6 is a block diagram of an example implementation of personnel authentication and tracking appliance combined with a traditional fire system smoke or heat detector.

DETAILED DESCRIPTION

Described herein are examples of network features that may be used in various contexts including, but not limited to, security/intrusion and alarm systems. Example security systems may include an intrusion detection panel that is electrically or wirelessly connected to a variety of sensors. Those sensors types may include motion detectors, cameras, and proximity sensors (used, e.g., to determine whether a door or window has been opened). Typically, such systems receive a relatively simple signal (electrically open or closed) from one or more of these sensors to indicate that a particular condition being monitored has changed or become unsecure.

For example, typical intrusion systems can be set-up to monitor entry doors in a building. When a door is secured, a proximity sensor senses a magnetic contact and produces an electrically closed circuit. When the door is opened, the proximity sensor opens the circuit, and sends a signal to the panel indicating that an alarm condition has occurred (e.g., an opened entry door).

Data collection systems are becoming more common in some applications, such as home safety monitoring. Data collection systems employ wireless sensor networks and wireless devices, and may include remote server-based monitoring and report generation. As described in more detail below, wireless sensor networks generally use a combination of wired and wireless links between computing devices, with wireless links usually used for the lowest level connections (e.g., end-node device to hub/gateway). In an example network, the edge (wirelessly-connected) tier of the network is comprised of resource-constrained devices with specific functions. These devices may have a small-to-moderate amount of processing power and memory, and may be battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Described is a solution that in addition to the traditional perimeter defense mechanisms provided by access control systems also performs functions that includes monitoring the locations of authorized personnel within a building or secure area, providing real-time monitoring during an evacuation or emergency so that security personnel can determine the location of missing people and provide detection of unauthorized people within a building or area.

Figure 1:
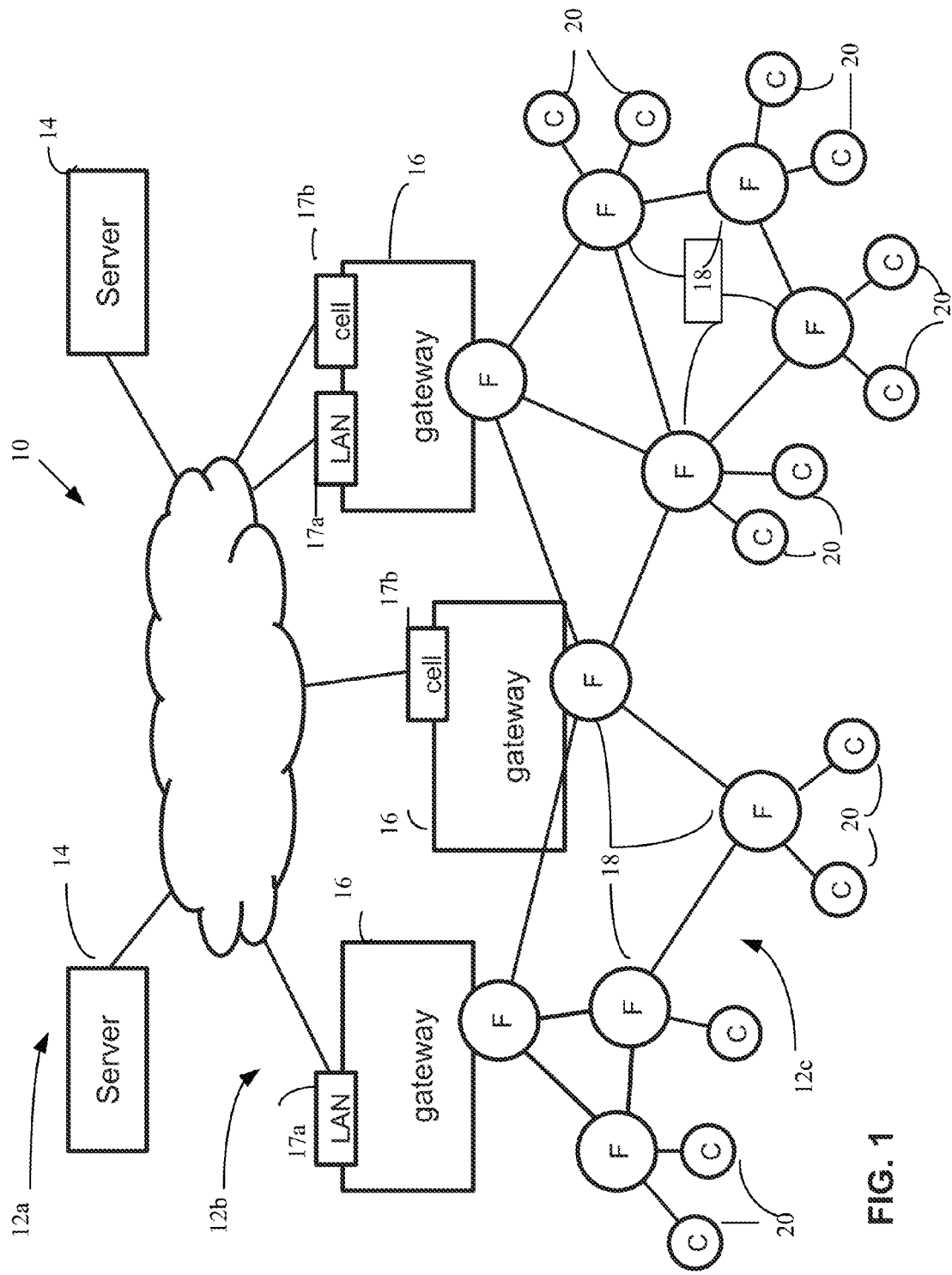
FIG. 1 is a schematic diagram of an exemplary networked security system.

Referring now to FIG. 1, an exemplary (global) distributed network 10 topology for a Wireless Sensor Network (WSN) is shown. In FIG. 1 the distributed network 10 is logically divided into a set of tiers or hierarchical levels 12a-12c. In an upper tier or hierarchical level 12a of the network are disposed servers and/or virtual servers 14 running a "cloud computing" paradigm that are networked together using well-established networking technology such as Internet protocols or which can be private networks that use none or part of the Internet. Applications that run on those servers 14 communicate using various protocols such as for Web Internet networks XML/SOAP, RESTful web service, and other application layer technologies such as HTTP and ATOM. The distributed network 10 has direct links between devices (nodes) as shown and discussed below.

The distributed network 10 includes a second logically divided tier or hierarchical level 12b, referred to here as a middle tier that involves gateways 16 located at central, convenient places inside individual buildings and structures. These gateways 16 communicate with servers 14 in the upper tier whether the servers are stand-alone dedicated servers and/or cloud based servers running cloud applications using web programming techniques. The middle tier gateways 16 are also shown with both local area network 17a (e.g., Ethernet or 802.11) and cellular network interfaces 17b.

The distributed network topology also includes a lower tier (edge layer) 12c set of devices that involve fully-functional sensor nodes 18 (e.g., sensor nodes that include wireless devices, e.g., transceivers or at least transmitters, which in FIG. 1 are marked in with an "F") as well as constrained wireless sensor nodes or sensor end-nodes 19 (marked in the FIG. 1 with "C"). In some embodiments wired sensors (not shown) can be included in aspects of the distributed network 10.

Constrained computing devices 19 as used herein are devices with substantially less persistent and volatile memory other computing devices, sensors in a detection system. Currently examples of constrained devices would be those with less than about a megabyte of flash/persistent memory, and less than 10-20 kbytes of RAM/volatile memory). These constrained devices 19 are configured in this manner generally due to cost/physical configuration considerations.

In a typical network, the edge (wirelessly-connected) tier of the network is comprised of highly resource-constrained devices with specific functions. These devices have a small-to-moderate amount of processing power and memory, and often are battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Each gateway is equipped with an access point (fully functional node or "F" node) that is physically attached to that access point and that provides a wireless connection point to other nodes in the wireless network. The links (illustrated by lines not numbered) shown in FIG. 1 represent direct (single-hop network layer) connections between devices. A formal networking layer (that functions in each of the three tiers shown in FIG. 1) uses a series of these direct links together with routing devices to send messages (fragmented or non-fragmented) from one device to another over the network.

The WSN 10 implements a state machine approach to an application layer that runs on the lower tier devices 18 and 19. Discussed below is an example of a particular implementation of such an approach. States in the state machine are comprised of sets of functions that execute in coordination, and these functions can be individually deleted or substituted or added to in order to alter the states in the state machine of a particular lower tier device.

The WSN state function based application layer uses an edge device operating system (not shown, but such as disclosed in the above mentioned provisional application) that allows for loading and execution of individual functions (after the booting of the device) without rebooting the device (so-called "dynamic programming"). In other implementations, edge devices could use other operating systems provided such systems allow for loading and execution of individual functions (after the booting of the device) preferable without rebooting of the edge devices.

In some implementations the distributed network 10 described above has nodes that provide video data and sensed credential data. The credentials or badges use technologies such as RFID, Bluetooth low energy (BLE), etc. with video. Sensors such as some of the nodes in FIG. 1 sense the presence of a credential tag typically carried by an individual passing through a range of the sensor. These sensors receive signals from badge/tag devices that incorporate circuitry operative using radio frequency identification (RFID), Bluetooth® low energy peer to peer devices, etc. Video information is received from cameras and other image capture devices that are disposed throughout the premises, e.g., as nodes on the network 10. One or more algorithms are applied to detect the presence of non-credentialed individuals, etc. Various ones of the nodes in FIG. 1 can receive from servers of FIG. 1 or other systems updates to functions (not shown) that are performed at these nodes.

Recognition software can be used to discriminate between objects that are a human and objects that are an animal; further facial recognition software can be built into video cameras. Such video cameras would comprise a processor and memory and the recognition software to process inputs (captured images) by the camera and produce data to convey information regarding recognition or lack of recognition of an individual captured by the video camera. The processing could also alternatively or in addition include information regarding characteristic of the individual in the area captured/monitored by the video camera.

Figure 2:
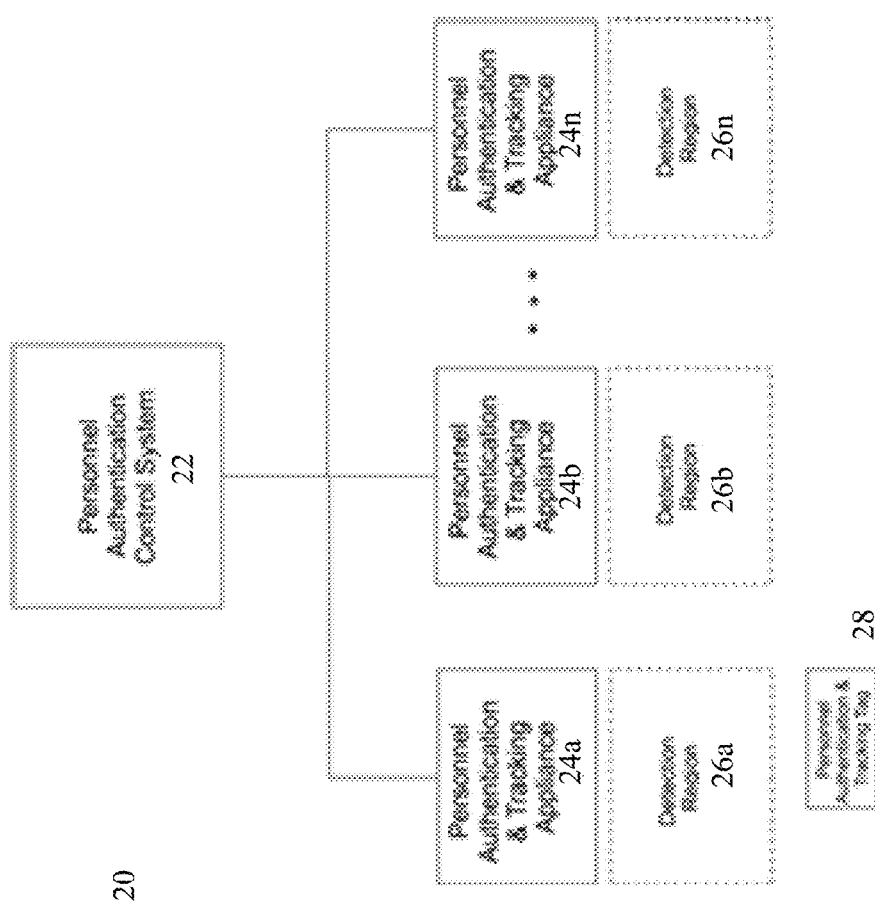
FIG. 2 is a block diagram of a personnel authentication & tracking system.

Referring now to FIG. 2, a personnel authentication and tracking system 20 is shown. The personnel authentication and tracking system 20, includes a personnel authentication control system 22 and at least one and generally a plurality personnel authentication and tracking appliances 24a-24n that detect presence of tags and authenticate the tags and send data regarding the detection and authentication to the personnel authentication control system 22. In an implementation involving the WSN 10 of FIG. 1, one or more of the servers therein could be the personnel authentication control system 22.

The personnel authentication and tracking appliances 24a-24n are fixed, e.g., in physical locations in, e.g., a building or a site (at internal and external locations) and read tags and/or other credentials within respective assigned detection zones 26a-26n. Each of the personnel authentication and tracking appliances 24a-24n produce counts and maintain counts of the number of people with credentialed badges in the respective detection zones 26a-26n. These counts are periodically and preferably continuously updated and maintained as people come and go through the detection zone assigned to the respective appliance 24a-24n. The personnel authentication and tracking appliances 24a-24n optionally may be combined within other electronic devices installed as part of the fire and securing infrastructure of the building.

The personnel authentication and tracking system 20 also includes personnel authentication and tracking tags 26, e.g., a portable access control token devices carried by individuals that include access control credentials (credentialed badges discussed above), which are required to gain access to a facility, via a traditional perimeter security system. The personnel authentication and tracking tags 26 also include electronics for authentication and tracking via the personnel authentication and tracking system 20, as will be further discussed below.

Figure 3:
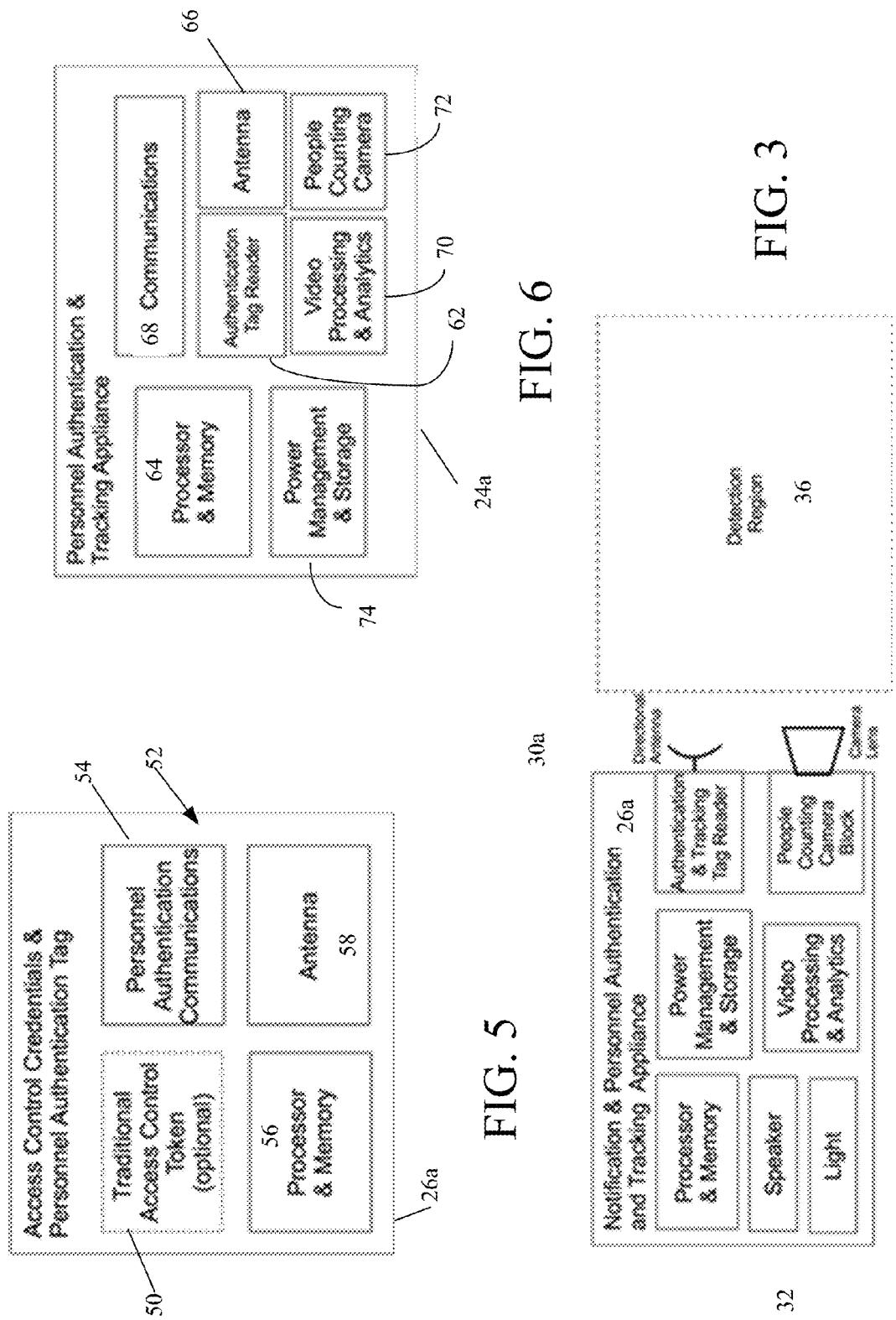
FIG. 3 is a block diagram of a personnel authentication and tracking tag.
Figure 4:
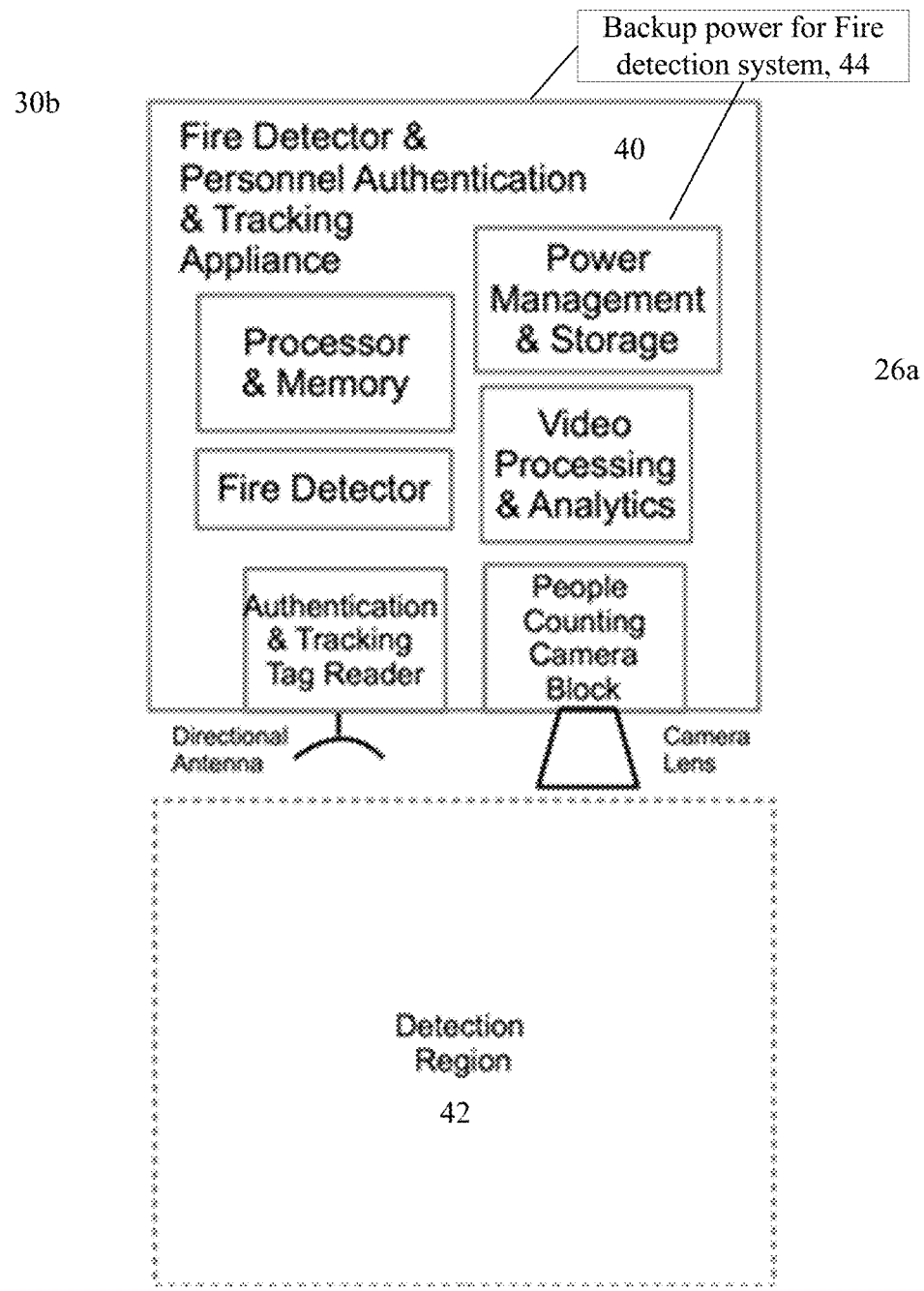
FIG. 4 is a block diagram of a personnel authentication and tracking appliance.

FIGS. 3 and 4 show two potential implementations 30a 30b of the personnel authentication and tracking system 20.

In FIG. 3, in one potential implementation 30a of the personnel authentication and tracking system 20, the personnel authentication and tracking appliances, e.g., 24a is shown combined with a speaker 32 and light 34 to convey instructions and to provide emergency lighting over a detection area 36.

In FIG. 4, another potential implementation of the personnel authentication and tracking system 20 has personnel authentication and a tracking appliance, e.g., appliance 24a combined with a fire system notification appliance 40, e.g., a fire detector device to monitor a detection region 42. This implementation uses backup power 44 provided by existing fire detection networks, which typically is more likely to be available during an emergency that normal building power.

Referring now to FIG. 5, personnel authentication and tracking tags 26a-26n for example, tag 26a in addition to conventional perimeter access control token, 50 also includes access control token personal authentication circuitry 52 including personnel communication processing 54, a processor and memory 56 as well as an antenna 58 as part of a wireless link to link the tag to appliances. The conventional perimeter access control token 50 is optional and allows access through existing legacy systems. The access control token personal authentication circuitry 52 operates with the personnel authentication and tracking appliances 24a-24n in the system 20 that executes various algorithms as discussed below.

Referring now to FIG. 6, the circuitry for the personnel authentication and tracking appliances 24a-24n, e.g., 24a includes an authentication tag reader 62, a processor and memory 64 as well as an antenna 66 as part of the wireless link to link the appliances to tags and/or the appliances to the server 22. The personnel authentication and tracking appliance 24a also includes control token personal authentication communication processing 68. The processor and memory are configured for video processing 70 and analytics 72. The personnel authentication and tracking appliances 24a-24n also receives images from cameras and in some implementations can include cameras used for taking images and for counting people in the images though feature recognition programming. The personnel authentication and tracking appliance 24a also includes power management and storage 76. Power can be provided on board or via a backup system such as the fire detection system mentioned above.

In some implementations for analytic processing 72 the personnel authentication and tracking appliances 24a-24n, e.g., 24a includes the processor and memory 64 and antenna 66 and thus can be one of the nodes on the sensor network of FIG. 1. The personnel authentication and tracking appliances 24a-24n, processor and memory 64 can receive various algorithms to process data whether authentication, tracking or video data from the sensor network via antenna 66 and RF circuitry.

Figure 7:
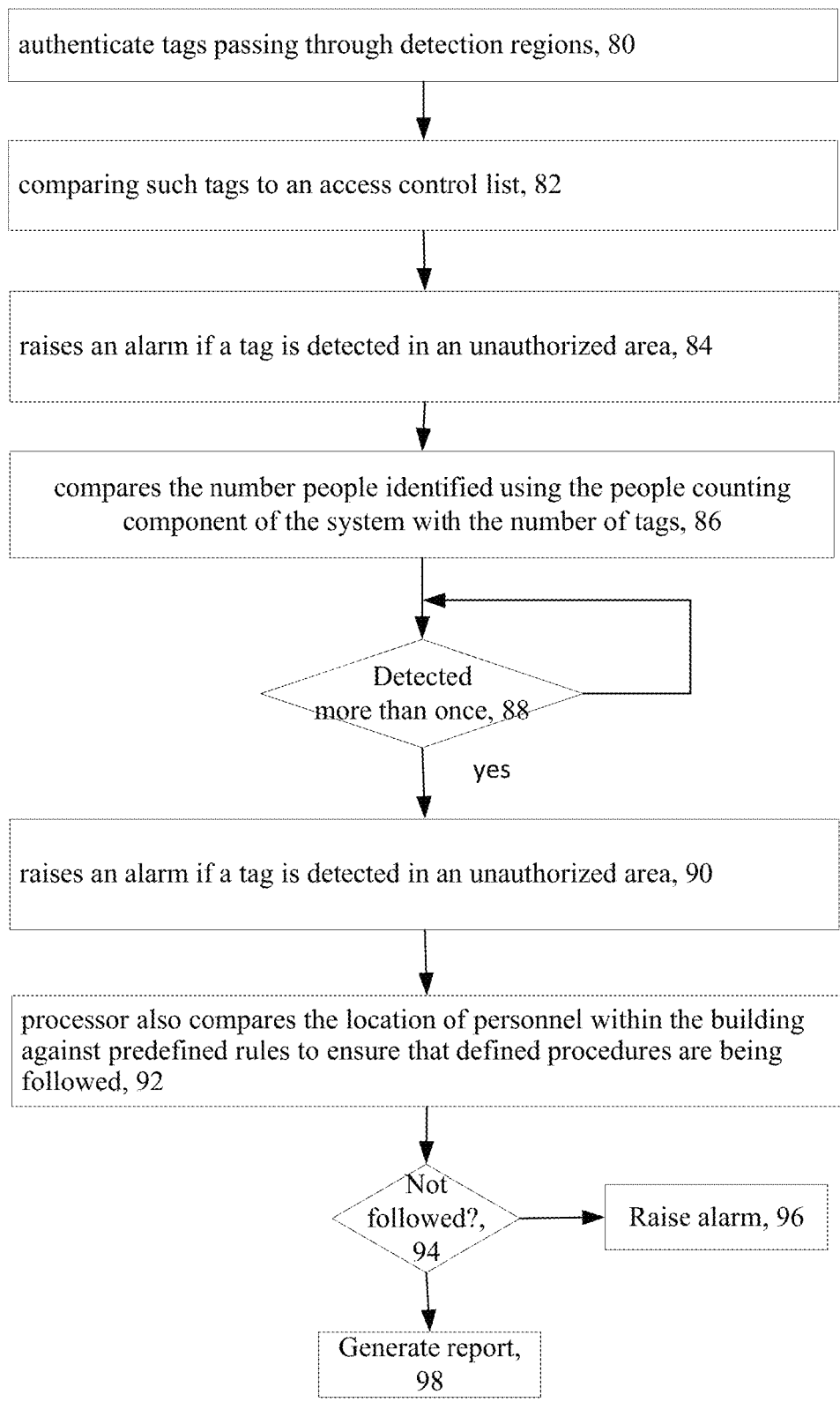
FIGS. 7 and 8 are flow charts depicting processing by a personnel authentication and tracking processor.

Referring now to FIG. 7, the personnel authentication and tracking processor and memory are configured to authenticate 80 tags passing through detection regions around and within a building. The authentication process includes comparing 82 such tags to an access control list that is stored on the personal authentication system 22 and/or within a particular one of the personnel authentication and tracking appliances 24a-24n. The access control list stores a set of tags corresponding to authorized persons and also stores data that delineates those areas in which the authorized users of such tags are authorized to have access. The personnel authentication and tracking processor raises 84 an alarm if a tag is detected in an unauthorized area.

The personnel authentication and tracking processor compares 86 the number people identified using the people counting component of the system with the number of tags identified by the system and raises 90 an alarm if the number of people counted exceeds the number of tags counted (indicating that a person is present that does not have a tag). The system in some instances 88 is programmed to only raise an alert after this condition has been detected in more than 1 detection zone or at different times within a single detection zone to reduce the risk of false alarms due to inaccuracies in the people counting system or the failure to read tags.

The personnel authentication and tracking processor also compares 92 the location of personnel within the building against predefined rules to ensure that defined procedures are being followed. Procedures are implementation specific. For instance, one procedure can be with regard to a cleaning crew. One procedure is to ensure that a cleaning crew visits all areas of the building. Another procedure is to ensure that a guard is completing the guard tour of all areas. Other procedures are possible. If a procedure is not followed 94 a report 98 and/or an alarm 96 is generated depending on the procedure.

In another procedure the personnel authentication and tracking processor determines if safety procedures are being followed and communications exceptions based on a set of predefined business rules such as making sure that at least 1 person trained in CPR is present on site.

Figure 8:
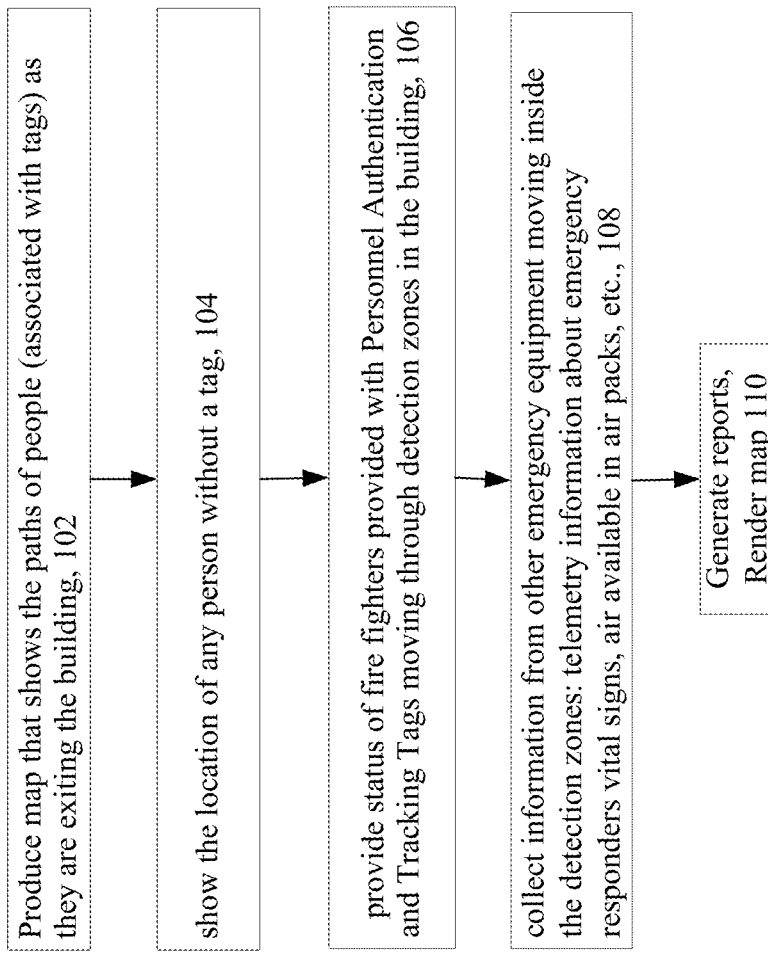

Referring now to FIG. 8, during an emergency the system 20 executes various algorithms that provide information about the status of an ongoing evacuation. Various algorithms that provide various functions are executed. For example, personnel authentication and tracking appliances 24a-24n covering detection zones in various points throughout the building produce graphical or visual descriptions of paths taken by of people (associated with tags) as they traverse though and are exiting the building.

The processor either in the system 22 or any of the personnel authentication and tracking appliances 24a-24n, periodically (in some implementations continuously) gathers tag information from various tags throughout the premises. This tag information is correlated with the access control list and as each tag passes past the personnel authentication and tracking appliances 24a-24n, the known location of that personnel authentication and tracking appliance can be used to determine a point in a path taken by the tag (i.e., individual carrying the tag).

For example, for personnel authentication and tracking appliances 24a-24n, if a tag (worn by a person) is detected first at personnel authentication and tracking appliance 24a then at personnel authentication and tracking appliance 24c then at personnel authentication and tracking appliances 24d and then personnel authentication and tracking appliances 24n the processor produces a path taken by the tag from detection zones associated with the corresponding ones of the personnel authentication and tracking appliances, i.e., appliances 24a, 24c, 24d and 24n. With personnel authentication and tracking appliances 24a-24n having known, fixed physical locations within a building and/or site the processor can determine the path taken by the tag. This process can be on-going for each tag in a building until that tag is "retired" by being verified as leaving the building.

The processor renders a map on, e.g., a display device of a schematic of the building or a floor in the building and can depict a path or a series of paths taken by each of the people wearing the tags. During an emergency, such as an incident with an armed intruder, the system can show the location of any person without a tag by correlating 104 personnel authentication and tracking appliances 24a-24n and/or the system 22 video information with the tag information. The system 22 can send video information from cameras to emergency responders and security managers.

During a fire, the system will continue to operate on the power supplied by the fire panel and can provide status 106 of fire fighters also provided with Personnel Authentication and Tracking Tags moving through detection zones in the building. During a fire or other emergency response, the system can collect information 108 from other emergency equipment moving inside the detection zones such as telemetry information about the emergency responders vital signs, the amount of air available in the their air packs, etc. The processor produces reports and or visual representation of any of these functions, at any time.

Figure 9:
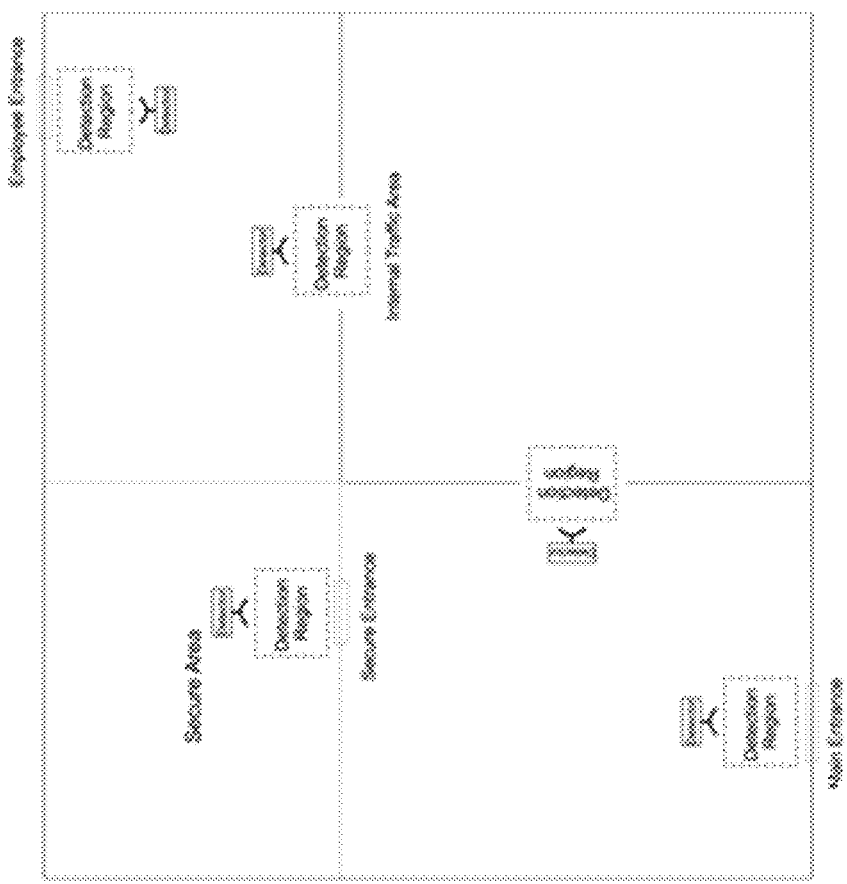
FIG. 9 is a block diagram showing deployment of the personnel authentication and tracking system appliances around site with external entrances, internal traffic areas and secure areas.

Referring now to FIG. 9 a potential deployment of Personnel authentication and tracking system appliances 24a-24n around a site specifically showing their placement at external entrances, internal traffic areas and secures areas is shown. In general, a specific deployment would be implementation and site specific. However, certain guidelines could be followed. For example, Personnel authentication and tracking system appliances 24a-24n would be deployed at external entrances/exits so that paths produced for each of the tags can show a tag entering and/or exiting the building. Personnel authentication and tracking system appliances would also be deployed in internal traffic areas in arrangements that can be used to show continuous paths of tags, and especially in large structures divided into many rooms on many floors, sufficient ones of the Personnel authentication and tracking system appliances would be deployed so as to minimize "holes" in tracking of badges in interior rooms. In addition the Personnel authentication and tracking system appliances could be deployed all secures areas. Numerous other configurations are possible.

Figure 10:
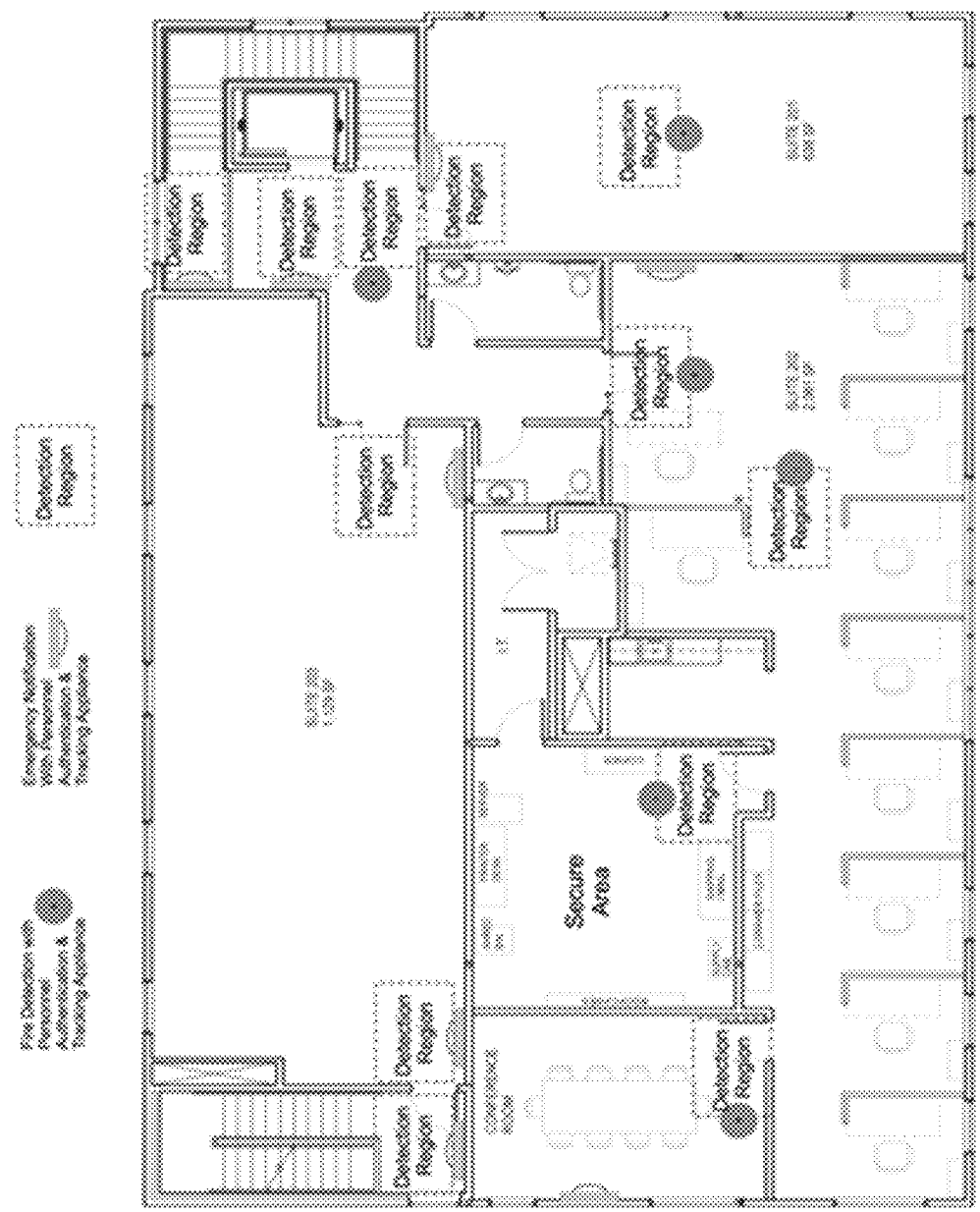
FIG. 10 is a block diagram showing deployment of the personnel authentication and tracking system appliances deployed as part of the fire notification and detection networks within a building.

FIG. 10 shows a potential deployment of the Personnel authentication and tracking system appliances (illustrated by the circle) for "detection regions" as denoted within a fire detection and notification system (not referenced). This deployment of the Personnel authentication and tracking system appliances 24a-24n uses power from the fire detection and notification system at least as battery backup to the Personnel authentication and tracking system appliances 24a-24n. In addition, as deployed in internal traffic areas the arrangements shown while not having every interior room having a Personnel authentication and tracking system appliance, nonetheless has such appliances deployed to minimize "holes" in tracking of badges in interior rooms.

Figure 11:
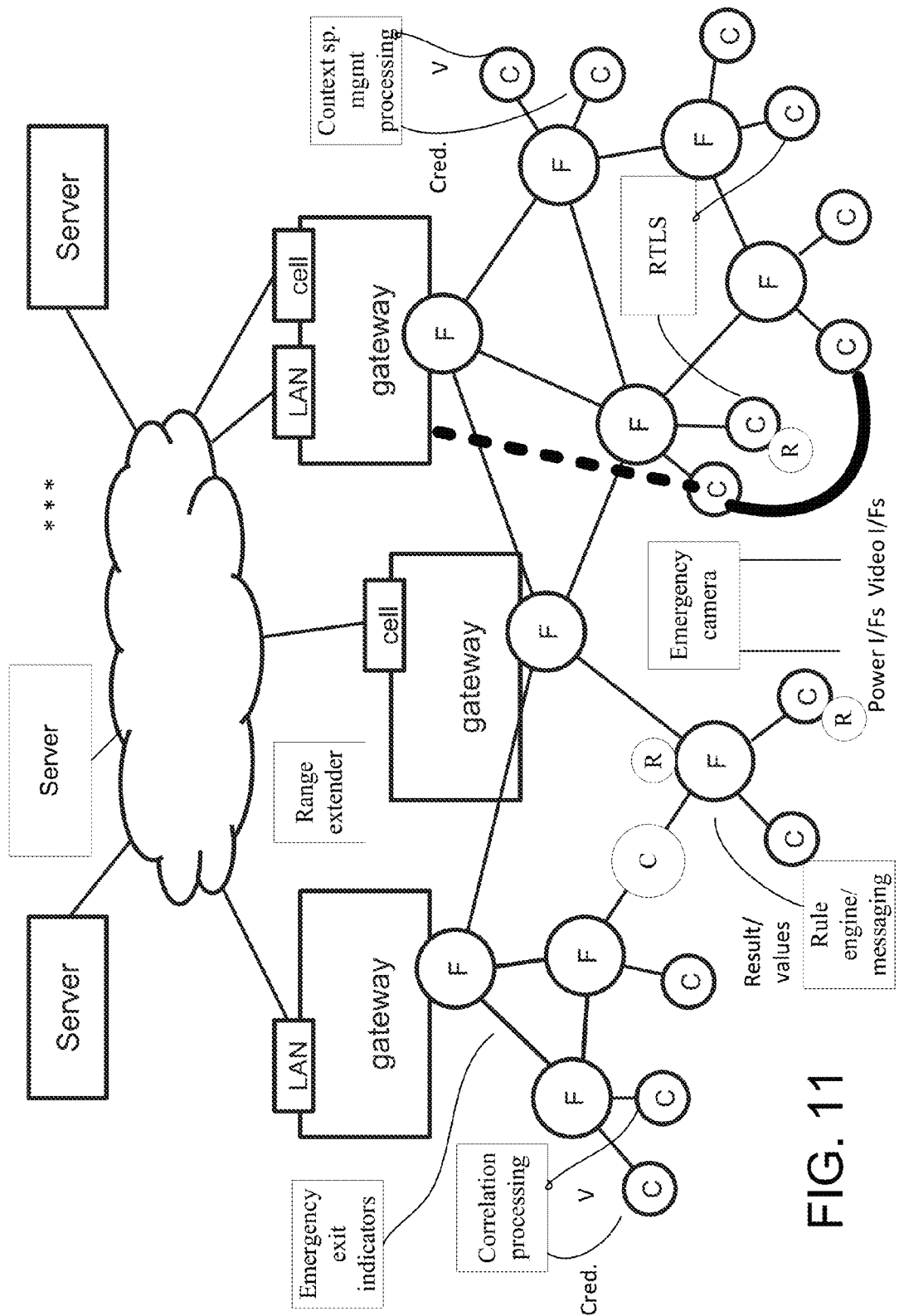
FIG. 11 is a block diagram of components of an example networked security system.

FIG. 11 shows an example of a security system having features of the WSN described with respect to FIG. 1 and having the various functionalities described herein. As shown in FIG. 11, correlation processing receives inputs from certain constrained nodes (although these can also be fully functional nodes). These inputs may include credential information and video information, and the correlation processing may produce correlated results that are sent over the network. Context management processing receives inputs from certain constrained nodes (although these can also be fully functional nodes) e.g., credential information and video and grouping information, and performs context processing with results sent over the network. The network supports operation of emergency exit indicators; emergency cameras as well as distributed rule processing and rule engine/messaging processing. Range extenders are used with e.g., gateways, and a real time location system receives inputs from various sensors (e.g., constrained type) as shown. Servers interface to the WSN via a cloud computing configuration and parts of some networks can be run as sub-nets.

The sensors provide in addition to an indication that something is detected in an area within the range of the sensors, detailed additional information that can be used to evaluate what that indication may be without the intrusion detection panel being required to perform extensive analysis of inputs to the particular sensor.

For example, a motion detector could be configured to analyze the heat signature of a warm body moving in a room to determine if the body is that of a human or a pet. Results of that analysis would be a message or data that conveys information about the body detected. Various sensors thus are used to sense sound, motion, vibration, pressure, heat, images, and so forth, in an appropriate combination to detect a true or verified alarm condition at the intrusion detection panel.

Recognition software can be used to discriminate between objects that are a human and objects that are an animal; further facial recognition software can be built into video cameras and used to verify that the perimeter intrusion was the result of a recognized, authorized individual. Such video cameras would comprise a processor and memory and the recognition software to process inputs (captured images) by the camera and produce the metadata to convey information regarding recognition or lack of recognition of an individual captured by the video camera. The processing could also alternatively or in addition include information regarding characteristic of the individual in the area captured/monitored by the video camera. Thus, depending on the circumstances, the information would be either metadata received from enhanced motion detectors and video cameras that performed enhanced analysis on inputs to the sensor that gives characteristics of the perimeter intrusion or a metadata resulting from very complex processing that seeks to establish recognition of the object.

Sensor devices can integrate multiple sensors to generate more complex outputs so that the intrusion detection panel can utilize its processing capabilities to execute algorithms that analyze the environment by building virtual images or signatures of the environment to make an intelligent decision about the validity of a breach.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory of the panel may further store software components allowing network communications and establishment of connections to the data network. The software components may, for example, include an internet protocol (IP) stack, as well as driver components for the various interfaces, including the interfaces and the keypad. Other software components suitable for establishing a connection and communicating across network will be apparent to those of ordinary skill.

Program instructions stored in the memory, along with configuration data may control overall operation of the panel.

The monitoring server includes one or more processing devices (e.g., microprocessors), a network interface and a memory (all not illustrated). The monitoring server may physically take the form of a rack mounted card and may be in communication with one or more operator terminals (not shown). An example monitoring server is a SURGARD™ SG-System III Virtual, or similar system.

The processor of each monitoring server acts as a controller for each monitoring server, and is in communication with, and controls overall operation of, each server. The processor may include, or be in communication with, the memory that stores processor executable instructions controlling the overall operation of the monitoring server. Suitable software enable each monitoring server to receive alarms and cause appropriate actions to occur. Software may include a suitable Internet protocol (IP) stack and applications/clients.

Each monitoring server of the central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A personnel authentication and tracking appliance comprises:
   one or more processor devices;
   memory operatively coupled to the one or more processor devices, with the memory executing a computer program that configures the one or more processor devices to:
   receive image data;
   read tags and other credentials within a corresponding detection zone associated with the personnel authentication and tracking appliance;
   authenticate the tags against an access control list;
   provide counts of the number of people in the corresponding detection zone by executing an analytic algorithm to count people detected in the received image data; and
   receive real time analytic algorithms to authenticate or count people detected in the received image data to modify processing on the personnel authentication and tracking appliance.

2. The personnel authentication and tracking appliance of claim 1 further comprising:
   a camera to capture the received image data.

3. The personnel authentication and tracking appliance of claim 1 further comprising:
   an authentication and tracking tag reader that read portable access control token devices that include access control credentials for authentication and tracking by the personnel authentication and tracking appliance.

4. The personnel authentication and tracking appliance of claim 1 wherein the personnel authentication and tracking appliance is further configured to:
   authenticate tags passing through detection regions against an access control list.

5. The personnel authentication and tracking appliance of claim 1 wherein the personnel authentication and tracking appliance is further configured to:
   compare the number people identified with the number of tags identified by the system;
   compare the location of personnel within the site against predefined rules; and
   raise an alarm when a discrepancy with the predefined rules is detected.

6. The personnel authentication and tracking system of claim 1 wherein the personnel authentication and tracking system appliance comprises power management circuity that includes backup power provided from a fire detection network.

7. The personnel authentication and tracking appliance of claim 1 wherein the personnel authentication and tracking system appliance when deployed within a fire detection and notification system has the fire detection and notification system to provide battery backup to the personnel authentication and tracking system appliance.

8. A computer implemented method comprises:
   authenticating and identifying by a personnel authentication and tracking appliance that includes a processor and memory, tags passing through detection regions with authenticating being performed with respect to an access control list;
   receiving by the personnel authentication and tracking appliance video data;
   processing the video data to count a number of people passing through or within one or more detection regions associated with the personnel authentication and tracking appliance;
   comparing by the personnel authentication and tracking appliance the number people counted by the received video data with the number of tags authenticated and identified by the personnel authentication and tracking appliance; and
   causing an alarm to be asserted when a discrepancy is detected within one or more of the detection regions.

9. The method of claim 8 further comprising:
   comparing the location of personnel against predefined rules to ensure compliance with rules.

10. The method of claim 8 further comprising:
    receiving analytic algorithms that automatically update algorithms in the personnel authentication and tracking appliance.

11. A system comprising:
    one or more processors devices; and
    memory, in communication with the one or more processor devices, with the system configured to:
    receive data from plural personnel authentication and tracking appliances that authenticate and identify tags passing through corresponding detection regions against an access control list stored in the system;
    receive video data from one or more of the plural personnel authentication and tracking appliances, with each of the plural personnel authentication and tracking appliances associated with one or more detection regions;
    processing the video data to determine a count of a number of people passing through or within the detection region or regions associated with the one or more of the plural personnel authentication and tracking appliances;
    compare the number people identified by the received data with the number of tags identified by the system; and
    cause an alarm to be asserted when a discrepancy is detected in the number people identified with the number of tags in a detection region with personnel within the detection region.

12. The system of claim 11 wherein the system is further configured to:

produce paths of tags as the tags pass through various ones of the detection regions associated with the personnel authentication and tracking appliances; and render the produced map on a rendering device of a schematic of the building or a floor plan depicting the various paths taken by the tags.

13. The system of claim 11 wherein the system is further configured to:

compare the location of personnel within the building against predefined rules to ensure that procedures are being followed.

* * * * *